US008865022B2

(12) United States Patent
Tsukatani et al.

(10) Patent No.: US 8,865,022 B2
(45) Date of Patent: Oct. 21, 2014

(54) PHOSPHOR PARTICLES AND MAKING METHOD

(75) Inventors: Toshihiko Tsukatani, Echizen (JP); Kazuhiro Wataya, Echizen (JP); Yasushi Takai, Echizen (JP); Takehisa Minowa, Echizen (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 13/336,137

(22) Filed: Dec. 23, 2011

(65) Prior Publication Data
US 2012/0175559 A1   Jul. 12, 2012

(30) Foreign Application Priority Data
Jan. 6, 2011  (JP) ................. 2011-001123

(51) Int. Cl.
*C09K 11/08*   (2006.01)
*C09K 11/77*   (2006.01)
*C01F 17/00*   (2006.01)

(52) U.S. Cl.
CPC ......... *C09K 11/7774* (2013.01); *C01P 2002/85* (2013.01); *C01P 2002/72* (2013.01); *C01P 2004/62* (2013.01); *C01P 2004/03* (2013.01); *C01P 2004/30* (2013.01); *C01P 2002/84* (2013.01); *C01F 17/0025* (2013.01); *C01P 2004/61* (2013.01); *C01P 2002/50* (2013.01)
USPC .................................................. 252/301.4 R

(58) Field of Classification Search
USPC ............. 252/301.4 R; 313/486, 487; 428/402
See application file for complete search history.

(56) References Cited

U.S. PATENT DOCUMENTS

| 5,851,428 | A | 12/1998 | Matsuda et al. |
| 5,998,925 | A | 12/1999 | Shimizu et al. |
| 2003/0049500 | A1* | 3/2003 | Takai et al. ................... 428/702 |
| 2006/0022580 | A1 | 2/2006 | Jermann et al. |
| 2006/0166057 | A1* | 7/2006 | Kodas et al. ..................... 429/22 |
| 2010/0048378 | A1* | 2/2010 | Tang et al. ..................... 501/133 |
| 2010/0294939 | A1* | 11/2010 | Kuntz et al. ............... 250/361 R |
| 2011/0305005 | A1* | 12/2011 | Tsukatani et al. ........... 362/97.3 |

FOREIGN PATENT DOCUMENTS

| CN | 1162617 A | 10/1997 |
| EP | 0 292 616 A1 | 11/1988 |
| EP | 0 936 682 A1 | 8/1999 |
| JP | 7-45655 A | 5/1995 |
| JP | 11-043672 A | 2/1999 |
| JP | 3700502 B2 | 9/2005 |

OTHER PUBLICATIONS

Japanese Office Action dated Mar. 28, 2012, issued in corresponding Japanese Patent Application No. 2011-285300.

(Continued)

*Primary Examiner* — Carol M Koslow
*Assistant Examiner* — Lynne Edmondson
(74) *Attorney, Agent, or Firm* — Westerman, Hattori, Daniels & Adrian, LLP

(57) ABSTRACT

Phosphor particles are provided in the form of spherical polycrystalline secondary particles consisting of a multiplicity of primary particles, including a garnet phase having the composition: $(A_xB_yC_z)_3C_5O_{12}$ wherein A is Y, Gd, and/or Lu, B is Ce, Nd, and/or Tb, C is Al and/or Ga, and x, y and z are in the range: $0.002 < y \leq 0.2$, $0 < z \leq 2/3$, and $x+y+z=1$. The phosphor particles are prepared by granulating powder oxides containing one or more of the elements A, B, and C, melting the granules in a plasma and solidifying outside the plasma, and heat treating the resulting particles in a non-oxidizing atmosphere at a temperature of higher than 800° C. to 1,700° C.

17 Claims, 11 Drawing Sheets

(56) References Cited

OTHER PUBLICATIONS

Chinese Office Action dated Apr. 29, 2014, issued in corresponding Chinese Patent Application No. 201210047417.4, w/ English Translation (14 pages).

Extended European Search Report "EESR" dated Feb. 19, 2014, issued in corresponding European Patent Application No. 12150171.2.

\* cited by examiner

PHOSPHOR PARTICLES AND MAKING METHOD

CROSS-REFERENCE TO RELATED APPLICATION

This non-provisional application claims priority under 35 U.S.C. §119(a) on Patent Application No. 2011-001123 filed in Japan on Jan. 6, 2011, the entire contents of which are hereby incorporated by reference.

TECHNICAL FIELD

This invention relates to phosphor particles suitable for use in illuminating devices such as general purpose light sources, backlight sources and headlight sources, and light-emitting diodes, and more particularly in illuminating devices including a phosphor capable of converting the wavelength of emission from a light source, and white light-emitting diodes; and a method of preparing the phosphor particles.

BACKGROUND ART

Light-emitting diodes (LEDs) are the most efficient among currently available light sources. In particular, white LEDs find a rapidly expanding share in the market as the next-generation light source to replace incandescent lamps, fluorescent lamps, cold cathode fluorescent lamps (CCFL), and halogen lamps. The white LEDs are arrived at by combining a blue LED with a phosphor capable of emission upon blue light excitation. Typically yellow light-emitting phosphors are combined with blue LEDs to produce pseudo-white light. Examples of suitable yellow light-emitting phosphors include $Y_3Al_5O_{12}$:Ce, $(Y,Gd)_3(Al,Ga)_5O_{12}$:Ce, $(Y,Gd)_3Al_5O_{12}$:Ce, $Tb_3Al_5O_{12}$:Ce, $CaGa_2S_4$:Eu, $(Sr, Ca, Ba)_2SiO_4$:Eu, and Ca-α-SiAlON:Eu.

JP 3700502 discloses a method for preparing a phosphor by dissolving rare earth elements Y, Gd, and Ce in stoichiometric proportions in an acid, co-precipitating the solution with oxalic acid, firing the co-precipitate to obtain an oxide of the co-precipitate, mixing it with aluminum oxide, and adding ammonium fluoride as flux thereto. The mixture is placed in a crucible and fired in air at 1,400° C. for 3 hours. The fired material is wet milled in a ball mill, washed, separated, dried, and finally sieved.

When a phosphor is synthesized by such a conventional method, of particle mixing and solid-phase reaction, the phosphor is generally composed of elements in a constant atomic ratio because the synthesis relies on crystal growth in the flux. The element which is introduced as the luminescent center is affected by the ionic radius of the matrix element of the crystal lattice. In the case of growth in the flux or melt, there is a tendency that an element having a different ionic radius, especially an element as the luminescent center having a larger ionic radius than the matrix element is kept out of the crystal during crystal growth. In $Y_3Al_5O_{12}$:Ce phosphor which is a typical example in JP 3700502, $Ce^{3+}$ ion to be introduced has a greater ionic radius than $Y^{3+}$ ion to be substituted thereby. Then, the prior art method based on crystal growth from the source powder in the flux is difficult to introduce a desired amount of $Ce^{3+}$ ion into crystals because $Ce^{3+}$ ion tends to be kept out of $Y_3Al_5O_{12}$ crystals in the course of crystal growth. In fact, when phosphor particles obtained from crystal growth by this method are analyzed for the distribution of elements, it is seen that $Ce^{3+}$ ion is concentrated at sites other than the crystal grains (see FIG. 5, for example).

CITATION LIST

Patent Document 1: JP 3700502 (U.S. Pat. No. 5,998,925, EP 0936682)

SUMMARY OF INVENTION

An object of the invention is to provide phosphor particles which are improved in emission efficiency over the prior art, and a method of preparing the phosphor particles.

The inventors have found that phosphor particles in the form of spherical polycrystalline secondary particles consisting of a multiplicity of primary particles, containing a garnet phase having the compositional formula (1):

wherein A is at least one rare earth element selected from Y, Gd, and Lu, B is at least one rare earth element selected from Ce, Nd, and Tb, C is Al and/or Ga, and x, y and z are positive numbers in the range: $0.002<y\leq0.2$, $0<z\leq2/3$, and $x+y+z=1$, and having an average particle size of 5 to 50 μm have a more uniform distribution of the rare earth element B introduced as the luminescent center and are advantageously used as a yellow light-emitting phosphor capable of emission at a high efficiency upon excitation by light from blue LED, in the manufacture of white LEDs or the like.

The inventors have also found that these phosphor particles can be prepared by providing a powder oxide or oxides containing one or more of the elements A, B, and C in compositional formula (1) as a starting material, using one powder oxide in which the elements A, B, and C are present in an atomic ratio of $C/(A+B)>5/3$ or mixing two or more powder oxides such that the elements A, B, and C may be present in an atomic ratio of $C/(A+B)>5/3$, granulating the powder oxide or powder oxide mixture into granules with an average particle size of 5 to 65 μm, melting the granules in a plasma and solidifying outside the plasma, thereby obtaining spherical particles, and heat treating the particles in a non-oxidizing atmosphere at a temperature of higher than 800° C. to 1,700° C.

In one aspect, the invention provides phosphor particles in the form of spherical polycrystalline secondary particles consisting of a multiplicity of primary particles, including a garnet phase having the compositional formula (1):

wherein A is at least one rare earth element selected from the group consisting of Y, Gd, and Lu, B is at least one rare earth element selected from the group consisting of Ce, Nd, and Tb, C is at least one element selected from the group consisting of Al and Ga, and x, y and z are positive numbers in the range: $0.002<y\leq0.2$, $0<z\leq2/3$, and $x+y+z=1$, the secondary particles having an average particle size of 5 to 50 μm.

Preferably, the primary particles have a particle size of 0.1 to 5 μm.

In another aspect, the invention provides a method for preparing the phosphor particles defined above, including the steps of providing a powder oxide or oxides containing one or more of the elements A, B, and C in compositional formula (1) as a starting material, using one powder oxide in which the elements A, B, and C are present in an atomic ratio of $C/(A+B)>5/3$ or mixing two or more powder oxides such that the elements A, B, and C may be present in an atomic ratio of $C/(A+B)>5/3$, granulating the powder oxide or powder oxide mixture into granules with an average particle size of 5 to 65 μm, melting the granules in a plasma and solidifying outside the plasma, thereby obtaining spherical particles, and heat treating the particles in a non-oxidizing atmosphere at a temperature of higher than 800° C. to 1,700° C.

Typically no flux is added to the powder oxide or powder oxide mixture.

Advantageous Effects of Invention

In the phosphor particles of the invention, the rare earth element serving as the luminescent center is more uniformly dispersed than in the prior art phosphor particles. The particles are advantageously used as a yellow light-emitting phosphor of a high emission efficiency.

DESCRIPTION OF EMBODIMENTS

Figure 1:
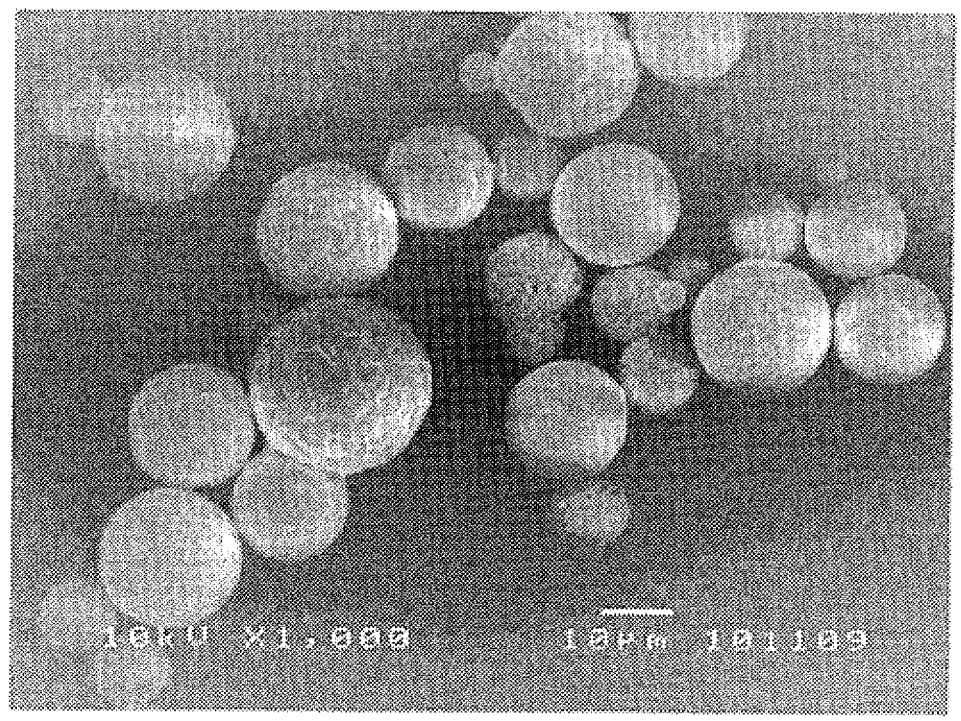
FIG. 1 is an electron micrograph of phosphor particles in Example 1.

As used herein, the term "phosphor" refers to a fluorescent substance. The terms "particles" and "powder" are equivalent in that the powder is a grouping of particles.

The particulate phosphor material of the invention is in the form of spherical polycrystalline secondary particles consisting of a multiplicity of primary particles, including a garnet phase having the compositional formula (1):

$$(A_xB_yC_z)_3C_5O_{12} \qquad (1)$$

wherein A is at least one rare earth element selected from the group consisting of yttrium (Y), gadolinium (Gd), and lutetium (Lu), B is at least one rare earth element selected from the group consisting of cerium (Ce), neodymium (Nd), and terbium (Tb), C is at least one element selected from the group consisting of aluminum (Al) and gallium (Ga), and x, y and z are positive numbers in the range: $0.002<y\leq0.2$, $0<z\leq2/3$, and $x+y+z=1$.

The garnet phase has a crystalline structure in which the element represented by B in compositional formula (1) (referred to as element B, hereinafter) serving as the luminescent center substitutes at some of the sites, in the crystal lattice, of the element represented by A in compositional formula (1) (referred to as element A, hereinafter) and in which the element represented by C in compositional formula (1) (referred to as element C, hereinafter) further substitutes (typically element C substitutes at sites of element A though the substitution site is not particularly limited). It is believed that in the garnet phase, the substitution of element A (which is otherwise less liable to substitution) by element B is promoted, achieving a full dispersion of element B in the phosphor particles. The garnet phase having such a crystalline structure could not be prepared by the prior art method.

The phosphor particles including such a garnet phase are prepared by providing a powder oxide or oxides containing one or more of the elements A, B, and C in compositional formula (1) as a starting material, using one powder oxide in which the elements A, B, and C are present in an atomic ratio of $C/(A+B)>5/3$ or mixing two or more powder oxides such that the elements A, B, and C may be present in an atomic ratio of $C/(A+B)>5/3$, preferably $C/(A+B)\geq5.02/2.98$, and its upper limit may be preferably $C/(A+B)\leq6/2$, more preferably $C/(A+B)\leq5.6/2.4$, granulating the powder oxide or powder oxide mixture into granules with an average article size of 5 to 65 μm, melting the granules in a plasma and solidifying outside the plasma, thereby obtaining spherical particles, and heat treating the particles in a non-oxidizing atmosphere at a temperature of higher than 800° C. to 1,700° C.

Two or more starting oxides are mixed such that the elements A, B, and C may be present in a desired ratio. The mixture is granulated. The granules are passed through a plasma where they are melted and become droplets. As the droplets move past the plasma, they are cooled and solidified. Once melted and solidified, the granules transform to composite oxide particles of amorphous nature. There are formed spherical particles having a size which ranges from the size of granules with an average particle size of 5 to 65 μm. Unlike the conventional method of preparing phosphor particles by mixing starting oxides with a flux in solid state and firing the oxides in the flux for thereby mixing the respective elements, the inventive method is characterized by introducing granules into a plasma and solidifying again, whereby spherical particles having an average particle size of 5 to 50 μm are formed in an amorphous state having respective elements uniformly dispersed. A minimal variation of composition among particles is also characteristic.

The spherical particles as solidified are then heat treated in a non-oxidizing atmosphere at a temperature of higher than 800° C. to 1,700° C., preferably 900° C. to 1,600° C., more preferably 1,000° C. to 1,500° C., yielding spherical crystalline particles containing a garnet phase of compositional formula (1).

The spherical particles as heat treated are available as polycrystalline secondary particles since they are obtained from formation of a multiplicity of minute crystalline primary particles upon crystallization and agglomeration of such primary particles.

The primary particles specifically have a particle size of 0.1 to 5 μm and more specifically 0.1 to 3 μm. The secondary particles specifically have an average particle size of 5 to 50 μm and more specifically 10 to 30 μm.

Unlike the garnet phase having the composition represented by $(A_aB_b)_3C_5O_{12}$ wherein A, B, and C are as defined in compositional formula (1) and a and b are positive numbers meeting $a+b=1$, the garnet phase having the composition represented by compositional formula (1) has a structure having further element C substituted therein, although the structure of the garnet phase of the phosphor particles of the invention is not limited thereto. It is believed that typically in the structure, element B is not substituted by element C, and element A is substituted by element C. Since element C has a smaller ionic radius than element A, it is believed that the occupation of element C at some sites of element A contributes to a likelihood of element B being incorporated in the crystal lattice.

As compared with the prior art method, the invention is advantageous in that diffusion of element B in the particle interior is easier because the particles obtained from melting and solidification is amorphous for the most part and the size of phosphor particles is substantially determined prior to crystallization by heat treatment, and that element B is more uniformly incorporated in crystals since element B can move to no sites other than in the particle interior.

Figure 5:
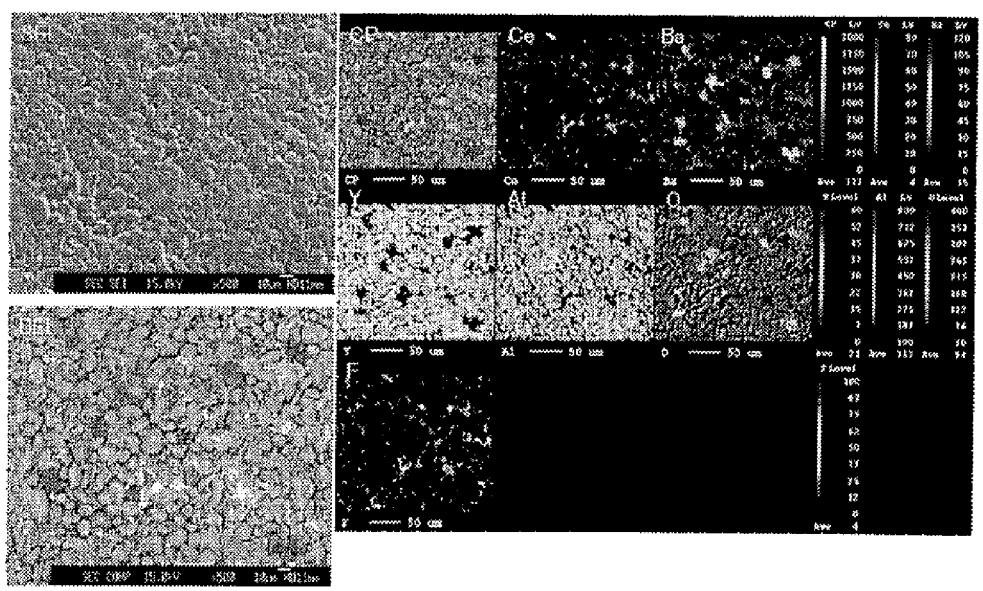
FIG. 5 is a cross-sectional image and diagrams showing element distributions on the cross-section of phosphor particles in Comparative Example 1 by electron probe microanalysis.

The prior art method of preparing phosphor particles has a problem associated with the addition of a flux during the steps of mixing source oxides and firing. If the flux is used, element B which should essentially be introduced into the garnet phase of phosphor particles tends to be taken into a fraction not contributing to fluorescence, and specifically combined with a component of the flux to form such a fraction. This is proven, when phosphor particles are prepared by the prior art method using barium fluoride as the flux and cerium as element B, for example, by the observation of peaks assigned to $BaCeOF_3$ on X-ray diffraction analysis and the distribution of individual elements on electron probe microanalysis (see FIGS. 5 and 6, for example).

Since element A to be substituted has a smaller ionic radium than element B to be introduced as the luminescent center, the phosphor particles prepared by the prior art method have a tendency that element B serving as the luminescent center is difficultly taken into the crystal lattice during crystal growth in the flux. For this reason, it is believed impossible to introduce element B serving as the luminescent center into the crystal lattice of the garnet phase of phosphor particles in a high concentration.

Figure 2:
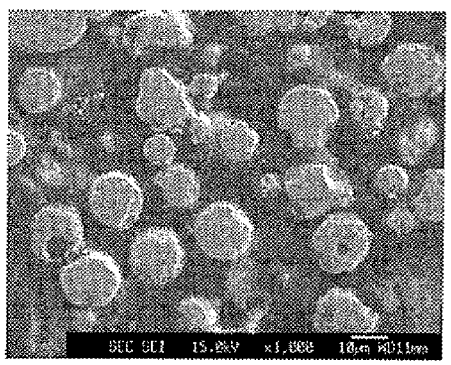
FIG. 2 is a cross-sectional image and diagrams showing element distributions on the cross-section of phosphor particles in Example 1 by electron probe microanalysis.
Figure 2:
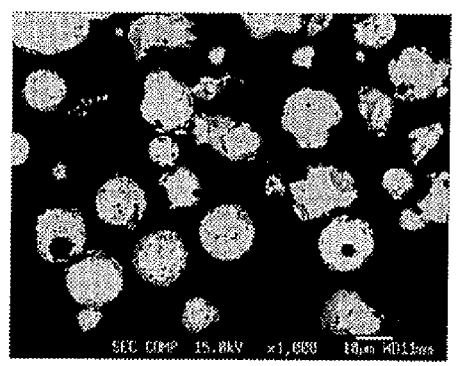
Figure 2:
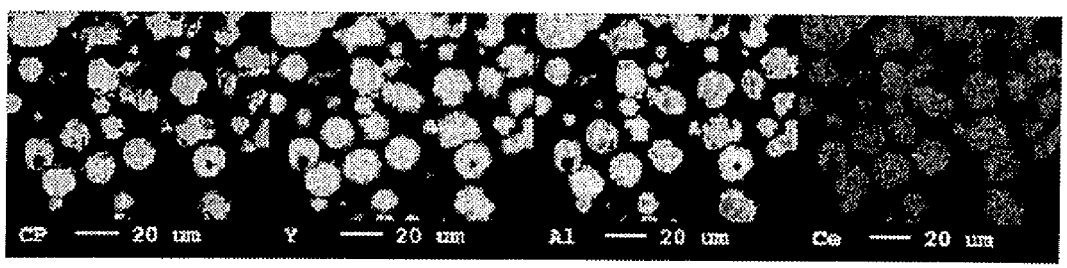

By contrast, the phosphor particles of the invention have element B uniformly dispersed in the interior of phosphor particles. It is possible to effectively introduce element B serving as the luminescent center into the crystal lattice of the garnet phase of phosphor particles (see FIG. 2, for example).

The garnet phase of the composition represented by compositional formula (1) included in the phosphor particles is the major phase among crystal phases in the phosphor particles. Preferably the garnet phase accounts for at least 99% by volume of all crystal phases.

It is now described how to produce phosphor particles. In the phosphor particles of the invention, the garnet phase has the composition represented by compositional formula (1), and is composed of elements A, B, and C in a ratio $(A_xB_yC_z)$: C:O=3:5:12. If phosphor particles are prepared by the prior art method, using a source material composition having a ratio $(A_xB_yC_z)$:C of less than 3:5, then a perovskite phase (e.g., $YAlO_3$) and a rare earth composite oxide phase (e.g., $Y_{0.2}Ce_{0.8}O_{1.9}$) form in addition to the garnet phase. On the other hand, if the ratio $(A_xB_yC_z)$:C is more than 3:5, then an alumina phase forms in addition to the garnet phase. Either case leads to a decline of formation of the garnet phase contributing to high-efficiency emission. On use, these phosphor particles suffer reductions of absorptance of exciting light and emission quantum efficiency.

This is in contrast with the method for preparing the inventive phosphor particles in an effective manner. Phosphor particles are prepared using a source material composition in which elements A, B, and C are present in an atomic ratio $C/(A+B)>5/3$. Even though the source material composition has such a ratio, the inventive method is successful in preparing phosphor particles in which the major crystal phase is the garnet phase.

Phosphor particles are prepared by first selecting a metal oxide(s) from single metal oxides, composite metal oxides, and metal oxide mixtures in accordance with the metal species in the desired phosphor particles, to provide a phosphor-forming composition. The phosphor-forming composition is dispersed in deionized water or an organic solvent to form a slurry.

The composite metal oxide or metal oxide mixture may be prepared, for example, by the following method. A co-precipitate is first prepared by selecting suitable metal salts from salts of metal elements to constitute the phosphor particles (for example, nitrates and chlorides of Y, Gd, Lu, Ce, Nd, Tb, Al, and Ga), dissolving the metal salts in water, and co-precipitating the aqueous solution. Alternatively, it may be prepared by selecting suitable starting materials from the metal salts and metal oxides described above, forming an aqueous solution or slurry thereof, and co-precipitating the aqueous solution or slurry. The resulting co-precipitate is fired at 800 to 1,500° C. in air, obtaining the composite oxide or oxide mixture. The firing time is usually 1 to 10 hours.

From the composite oxide or oxide mixture thus obtained, a slurry of phosphor-forming composition is prepared. If necessary, organic additives such as dispersant and binder may be added to the slurry of the phosphor-forming composition. The slurry may be optionally milled into a slurry of fine particles preferably having an average particle size of 0.01 to 2.0 μm. By a granulation technique, generally spherical granules (precursor) of the desired particle size may be prepared from the slurry. Suitable granulation techniques include air atomizing with two-fluid nozzle or four-fluid nozzle, fluidized-bed granulation, centrifugal atomization, tumbling granulation, agitation granulation, compression granulation (such as by rubber or isostatic pressing), extrusion granulation, and disintegration granulation. The granules are compositionally uniform among them due to granulation from slurry. The granules preferably have a size of 5 to 65 μm, and specifically a size substantially equivalent to the phosphor particles obtained therefrom after heat treatment, for example, an average particle size corresponding to 100 to 130% of that of phosphor particles after heat treatment.

The granules are passed through a plasma where they are melted into droplets. The plasma source used herein may be a high-frequency plasma or direct-current plasma. The temperature of the plasma should be higher than the melting points of the source metal oxides including rare earth oxides, aluminum oxide, and gallium oxide.

Past the plasma, the droplets are cooled and solidified into particles again. These particles are spherical amorphous particles which exhibit very broad peaks on XRD analysis. The particles as such have a low phosphor quantum efficiency, which is usually as low as 40 to 60%. Also the absorptance of exciting light is as low as 50 to 70%. Therefore, the particles resulting from plasma melting must be heat treated in a non-oxidizing atmosphere, for example, a rare gas atmosphere such as argon or helium, a nitrogen atmosphere, or a similar atmosphere in which the inert gas is, in part, replaced by a reducing gas such as hydrogen before the desired crystalline phosphor particles can be obtained. A non-oxidizing atmosphere is used as the heat treating atmosphere to avoid oxidation of element B serving as the luminescent center.

The temperature of heat treatment should be higher than 800° C., preferably 900° C. or higher, more preferably 1,000° C. or higher to provide for full crystal growth in phosphor particles. Since the fusion of phosphor particles can adversely affect the distribution of particle size of phosphor particles, the heating temperature should be up to 1,700° C., preferably up to 1,600° C., and more preferably up to 1,500° C. The heat treatment may be carried out in two or more divided modes for purposes of preventing fusion of phosphor particles. It is also possible for purposes of preventing fusion of phosphor particles to control the atmosphere of heat treatment for example, by heating in an oxidizing atmosphere, typically air, at a temperature of up to 800° C., and changing to a reducing atmosphere for heating at a temperature in excess of 800° C.

In the phosphor particles thus obtained, a garnet phase of the composition containing element C richer than in the prior art is formed as the crystal phase, and element B contributing to emission is effectively taken in the crystals. The phosphor particles generally have an absorptance of at least 85%, specifically at least 90% of exciting light and an internal quantum efficiency of at least 94% at an excitation wavelength of 450 nm, indicating a high emission efficiency.

The phosphor particles are suited as a phosphor for converting the wavelength of light from a light-emitting component of a LED. Thus, the phosphor particles can be advantageously used in a LED as well as an illuminating device and a backlight device using the LED.

EXAMPLE

Examples are given below by way of illustration and not by way of limitation.

Example 1

A powder mixture was obtained by mixing a yttrium oxide ($Y_2O_3$) powder of 99.9% purity having an average particle size of 1.0 μm, an aluminum oxide ($Al_2O_3$) powder of 99.0% purity having an average particle size of 0.5 μm, and a cerium oxide ($CeO_2$) powder of 99.9% purity having an average particle size of 0.2 μm in such amounts to give a molar ratio Y:Al:Ce of 2.94:5.5:0.06. In a ball mill, 1,000 g of the powder mixture was milled for 6 hours together with 1,500 g of deionized water, 10 g of poly(ammonium acrylic acid), and 2 g of carboxymethyl cellulose. The resulting slurry was granulated through a two-fluid nozzle, obtaining granules having an average particle size of 22 μm. The granules were heat treated in air at 1,000° C. for 2 hours to burn off the organic matter.

The granules were passed through an argon plasma where they were melted. The melt was then solidified again, obtaining spherical particles. On qualitative analysis by XRD, the particles were found amorphous.

The spherical particles were heat treated in argon gas containing 1 vol % of hydrogen gas at 1,350° C. for 5 hours, yielding phosphor particles.

The phosphor particles thus obtained were observed under an electron microscope. A photomicrograph is shown in FIG. 1. It is evident from the photomicrograph that each phosphor particle is a secondary particle composed of agglomerated primary particles and looks to have a spherical or substantially spherical shape. From the microscopic image, the average particle size of phosphor particles and the particle size of primary particles of which the phosphor particles were composed were measured. The results are shown in Table 1.

Next, a cross section of phosphor particles was taken by embedding phosphor particles in an epoxy resin and grinding the cured resin. The cross section was observed by an electron probe microanalyzer for detecting the distribution of respective elements, with the results shown in FIG. 2. The analytical results demonstrate a substantially uniform distribution of element Ce in phosphor particles.

Figure 3:
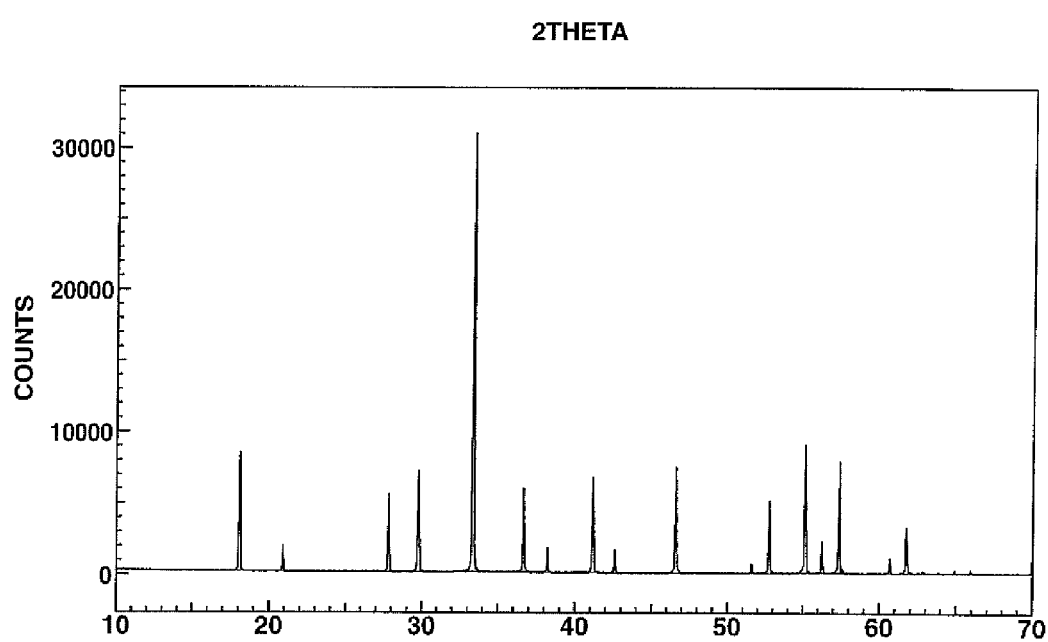
FIG. 3 is an X-ray diffraction profile of phosphor particles in Example 1.

The phosphor particles were further analyzed by XRD, with the result shown in FIG. 3. The diffraction pattern of the phosphor particles, as to the major phase, is coincident with the diffraction peaks of yttrium-aluminum garnet phase, proving that the phosphor particles contain the garnet phase as the major phase. Alumina and extra phases other than the garnet phase were not observed.

An absorptance and internal quantum efficiency of the phosphor particles were measured over an emission wavelength range of 480 to 780 nm at an excitation wavelength of 450 nm using an integrating sphere. The result is also shown in Table 1.

Comparative Example 1

A powder mixture was obtained by mixing a yttrium oxide ($Y_2O_3$) powder of 99.9% purity having an average particle size of 1.0 μm, an aluminum oxide ($Al_2O_3$) powder of 99.0% purity having an average particle size of 3.0 μm, and a cerium oxide ($CeO_2$) powder of 99.9% purity having an average particle size of 0.2 μm in such amounts to give a molar ratio Y:Al:Ce of 2.94:5.5:0.06. To 1,000 g of the powder mixture, 200 g of barium fluoride was added as flux. The mixture was thoroughly milled, fed in an aluminum crucible, and heat treated in argon gas at 1,400° C. for 10 hours. The fired product was water washed, separated, and dried, obtaining phosphor particles.

Figure 4:
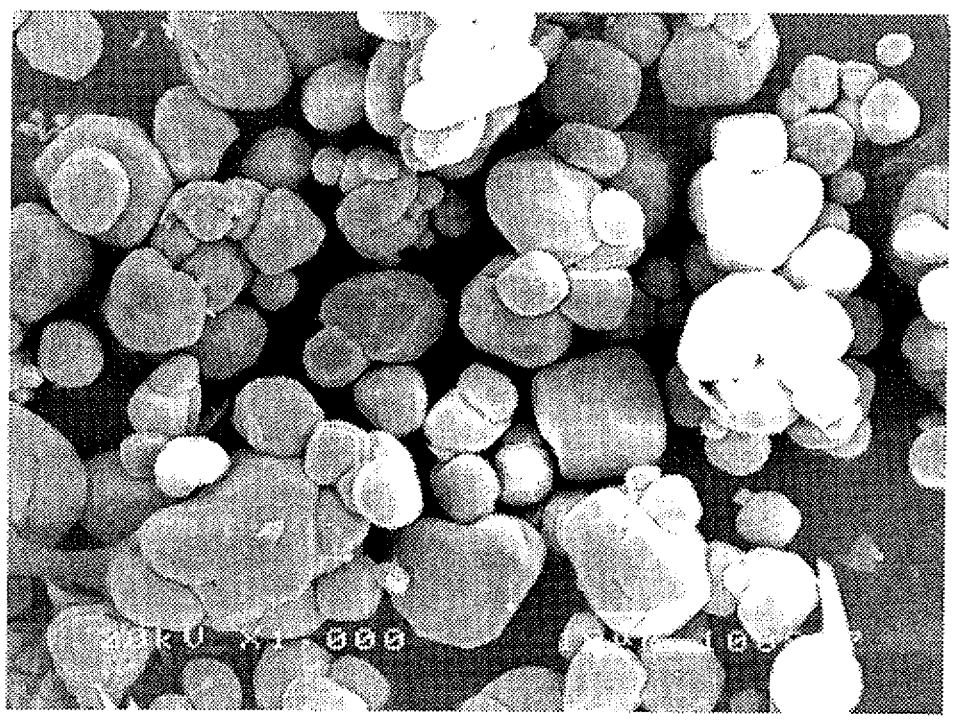
FIG. 4 is an electron micrograph of phosphor particles in Comparative Example 1.

The phosphor particles thus obtained were observed under an electron microscope. A photomicrograph is shown in FIG. 4. The phosphor particles looked to have a polyhedral shape, with crystal faces observed. From the microscopic image, the average particle size of phosphor particles was measured. The results are also shown in Table 1.

Next, a cross section of phosphor particles was taken by grinding the cured epoxy resin having phosphor particles embedded therein. The cross section was observed by an electron probe microanalyzer for detecting the distribution of respective elements, with the results shown in FIG. 5. The analytical results demonstrate that element Ce is present not only in the garnet crystal phase, but also in other portions.

Figure 6:
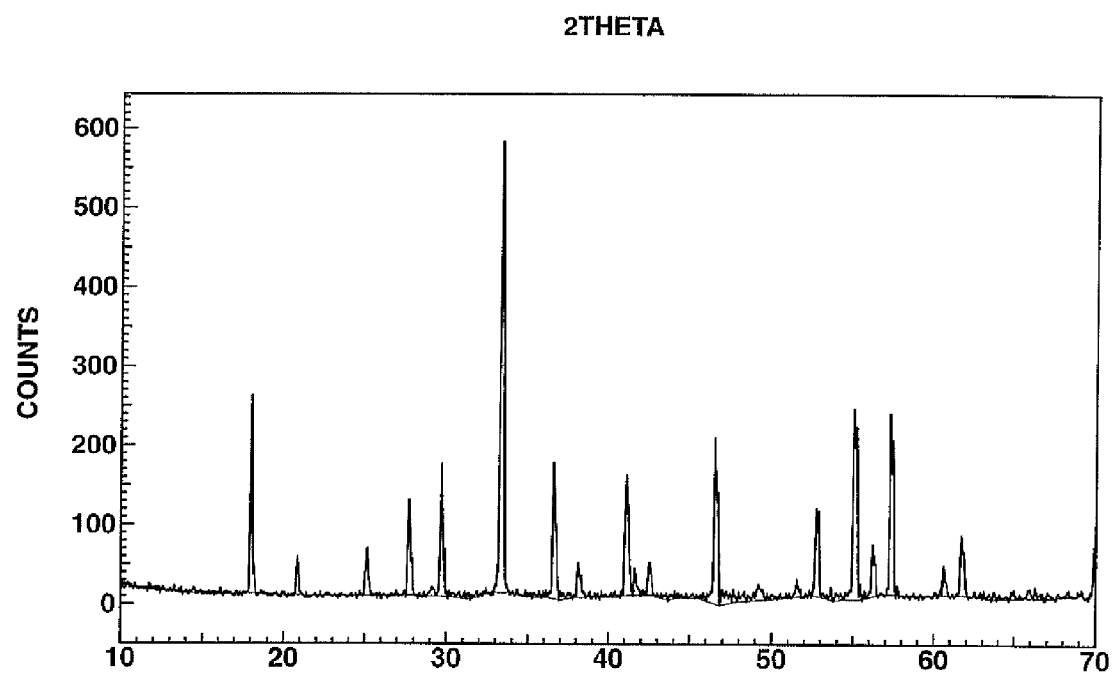
FIG. 6 is an X-ray diffraction profile of phosphor particles in Comparative Example 1.

The phosphor particles were further analyzed by XRD, with the result shown in FIG. 6. The diffraction pattern of the phosphor particles, as to the major phase, is coincident with the diffraction peaks of yttrium-aluminum garnet phase, proving that the phosphor particles contain the garnet phase as the major phase. In addition to the garnet phase, phases of $BaCeOF_3$ and the like were observed.

An absorptance and internal quantum efficiency of the phosphor particles were measured over an emission wavelength range of 480 to 780 nm at an excitation wavelength of 450 nm using an integrating sphere. The result is also shown in Table 1.

Comparative Example 2

A powder mixture was obtained by mixing a yttrium oxide ($Y_2O_3$) powder of 99.9% purity having an average particle size of 1.0 μm, an aluminum oxide ($Al_2O_3$) powder of 99.0% purity having an average particle size of 0.5 μm, and a cerium oxide ($CeO_2$) powder of 99.9% purity having an average particle size of 0.2 μm in such amounts to give a molar ratio Y:Al:Ce of 2.94:4.8:0.06. In a ball mill, 1,000 g of the powder mixture was milled for 6 hours together with 1,500 g of deionized water, 10 g of poly(ammonium acrylic acid), and 2 g of carboxymethyl cellulose. The resulting slurry was granulated through a two-fluid nozzle, obtaining granules having an average particle size of 15 μm. The granules were heat treated in air at 1,000° C. for 2 hours to burn off the organic matter.

The granules were passed through an argon plasma where they were melted. The melt was then solidified again, obtaining spherical particles. On qualitative analysis by XRD, the particles were found amorphous.

The spherical particles were heat treated in argon gas containing 1 vol % of hydrogen gas at 1,350° C. for 5 hours, yielding phosphor particles.

Figure 7:
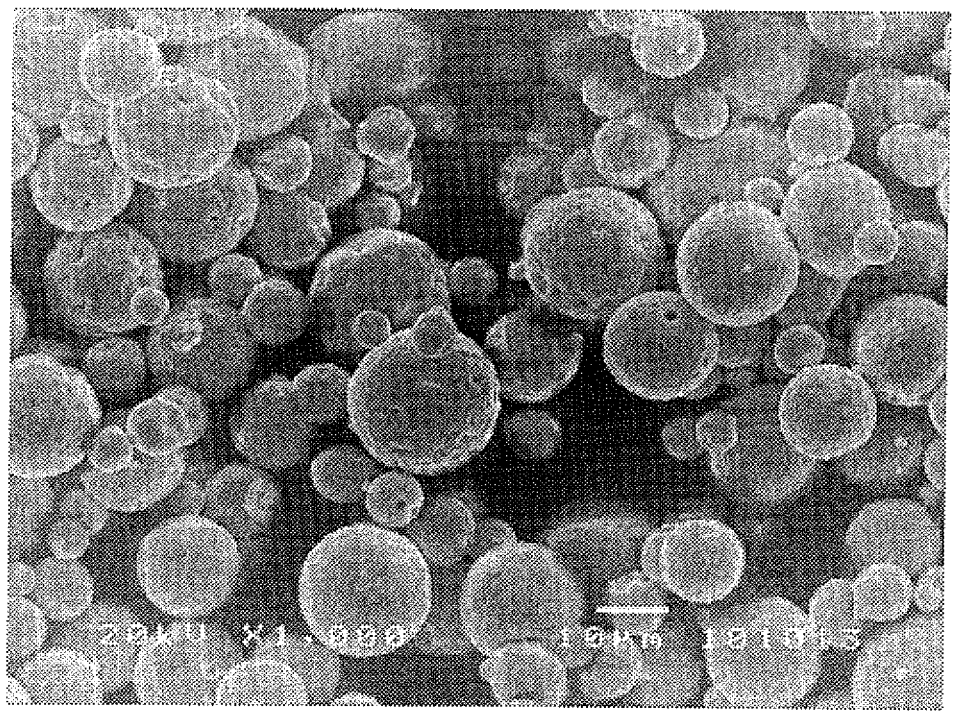
FIG. 7 is an electron micrograph of phosphor particles in Comparative Example 2.

The phosphor particles thus obtained were observed under an electron microscope. A photomicrograph is shown in FIG. 7. It is evident from the photomicrograph that each phosphor particle is a secondary particle composed of agglomerated primary particles and looks to have a spherical or substantially spherical shape. From the microscopic image, the average particle size of phosphor particles and the particle size of primary particles of which the phosphor particles were composed were measured. The results are shown in Table 1.

Figure 8:
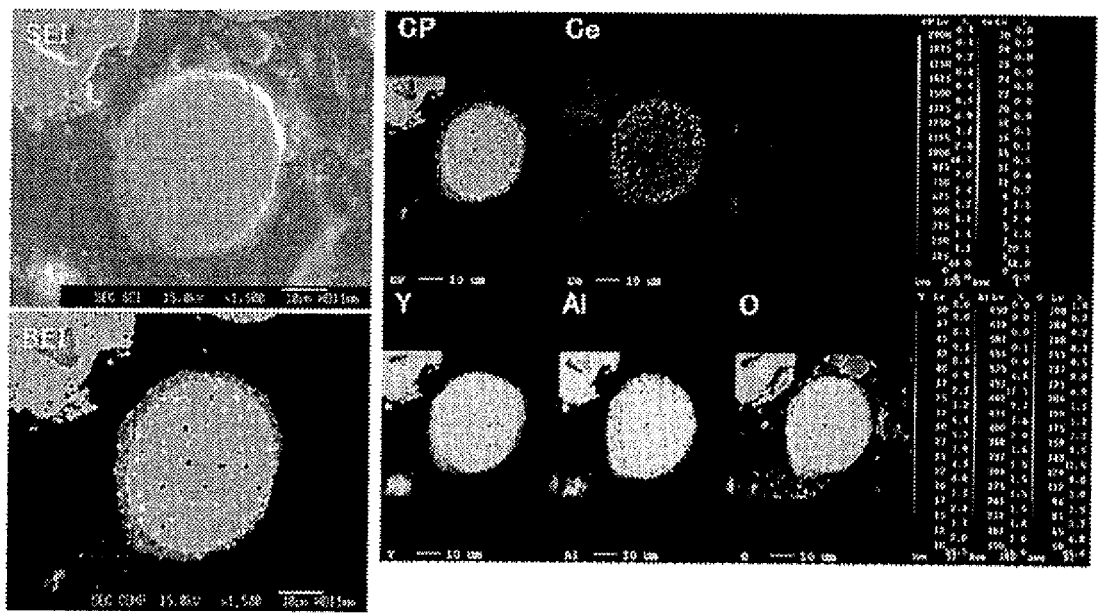
FIG. 8 is a cross-sectional image and diagrams showing element distributions on the cross-section of phosphor particles in Comparative Example 2 by electron probe microanalysis.

Next, a cross section of phosphor particles was taken by grinding the cured epoxy resin having phosphor particles embedded therein. The cross section was observed by an electron probe microanalyzer for detecting the distribution of respective elements, with the results shown in FIG. 8. The analytical results demonstrate the segregation of element Ce in phosphor particles.

Figure 9:
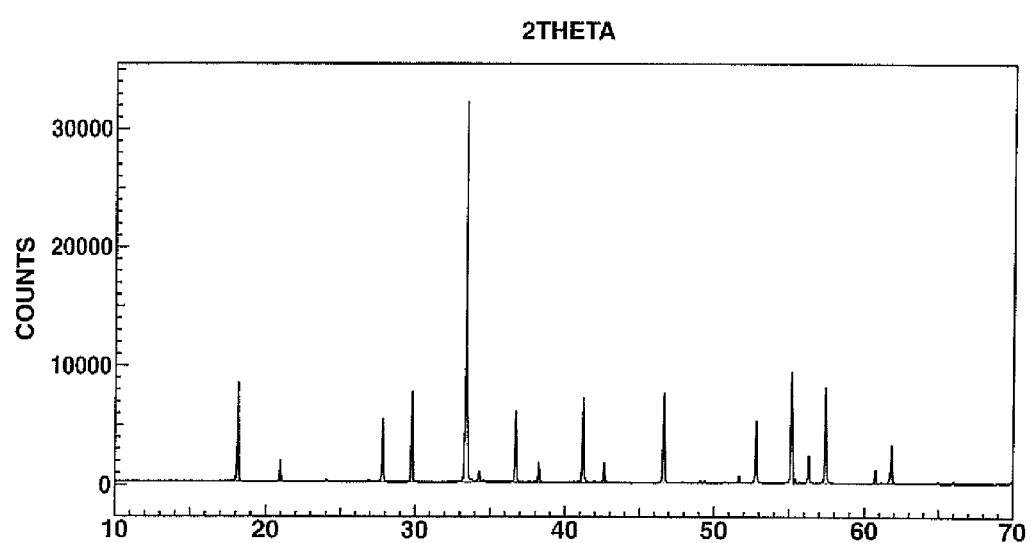
FIG. 9 is an X-ray diffraction profile of phosphor particles in Comparative Example 2.

The phosphor particles were further analyzed by XRD, with the result shown in FIG. 9. The diffraction pattern of the phosphor particles, as to the major phase, is coincident with the diffraction peaks of yttrium-aluminum garnet phase, proving that the phosphor particles contain the garnet phase as the major phase. In addition to the garnet phase, phases of yttrium-aluminate (YAP) and the like were observed.

An absorptance and internal quantum efficiency of the phosphor particles were measured over an emission wavelength range of 480 to 780 nm at an excitation wavelength of 450 nm using an integrating sphere. The result is also shown in Table 1.

Example 2

A powder mixture was obtained by mixing a Lutetium oxide ($Lu_2O_3$) powder of 99.9% purity having an average particle size of 1.0 μm, an aluminum oxide ($Al_2O_3$) powder of 99.0% purity having an average particle size of 0.5 μm, and a cerium oxide ($CeO_2$) powder of 99.9% purity having an average particle size of 0.2 μm in such amounts to give a molar ratio Lu:Al:Ce of 2.94:5.5:0.06. In a ball mill, 1,000 g of the powder mixture was milled for 6 hours together with 1,500 g of deionized water, 10 g of poly(ammonium acrylic acid), and 2 g of carboxymethyl cellulose. The resulting slurry was granulated through a two-fluid nozzle, obtaining granules having an average particle size of 20 μm. The granules were heat treated in air at 1,400° C. for 2 hours to burn off the organic matter.

The granules were passed through an argon plasma where they were melted. The melt was then solidified again, obtaining spherical particles. On qualitative analysis by XRD, the particles were found amorphous.

The spherical particles were heat treated in argon gas containing 1 vol % of hydrogen gas at 1,350° C. for 5 hours, yielding phosphor particles.

Figure 10:
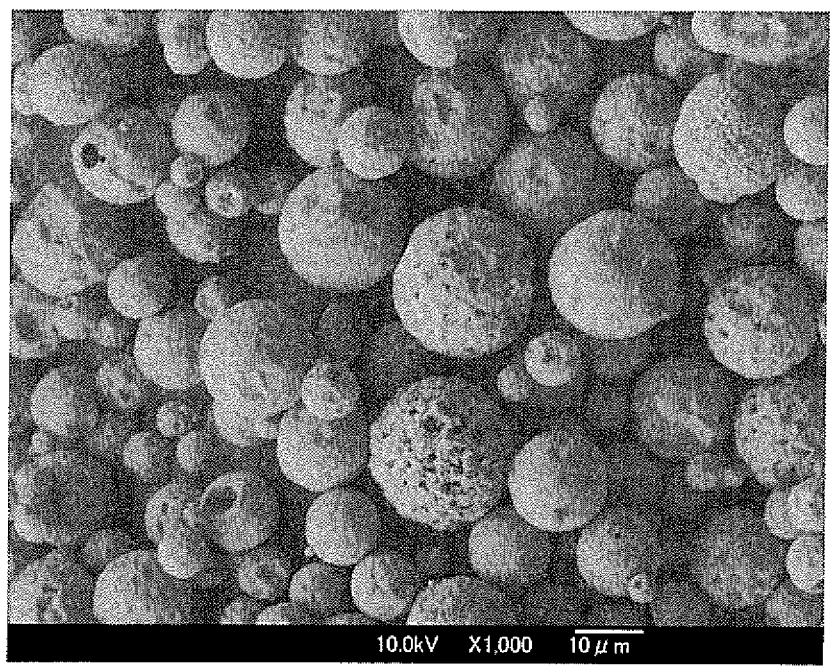
FIG. 10 is an electron micrograph of phosphor particles in Example 2.

The phosphor particles thus obtained were observed under an electron microscope. A photomicrograph is shown in FIG. 10. It is evident from the photomicrograph that each phosphor particle is a secondary particle composed of agglomerated primary particles and looks to have a spherical or substantially spherical shape. From the microscopic image, the average particle size of phosphor particles and the particle size of primary particles of which the phosphor particles were composed were measured. The results are shown in Table 1.

Next, a cross section of phosphor particles was taken by embedding phosphor particles in an epoxy resin and grinding the cured resin. The cross section was observed by an electron probe microanalyzer for detecting the distribution of respective elements. The analytical results demonstrate a substantially uniform distribution of element Ce in phosphor particles.

Figure 11:
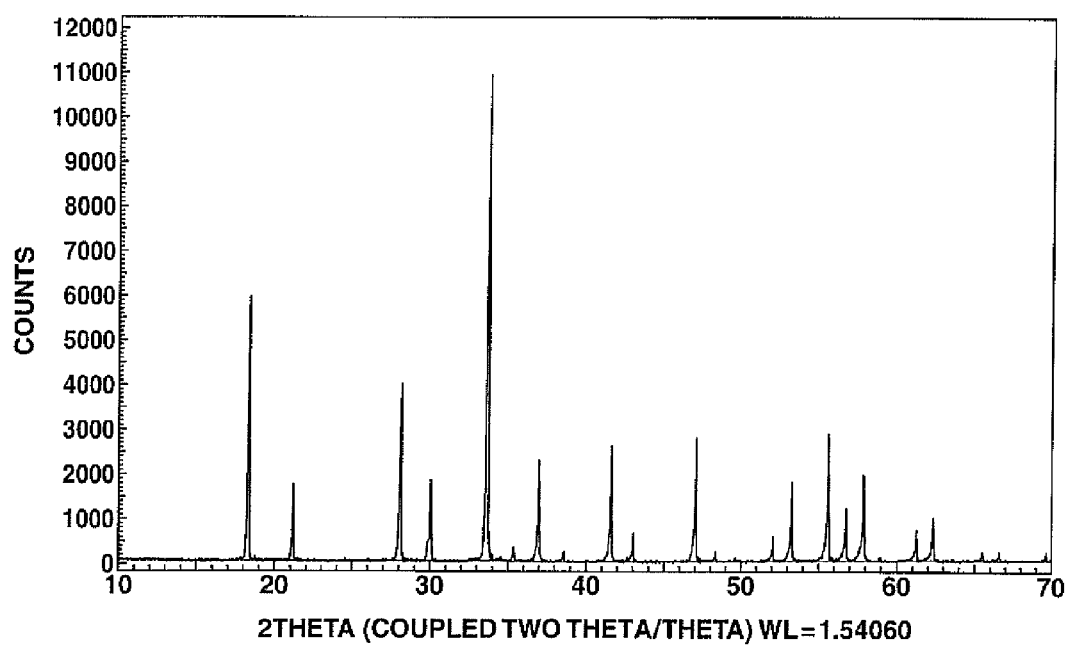
FIG. 11 is an X-ray diffraction profile of phosphor particles in Example 2.

The phosphor particles were further analyzed by XRD, with the result shown in FIG. 11. The diffraction pattern of the phosphor particles, as to the major phase, is coincident with the diffraction peaks of lutetium-aluminum garnet phase, proving that the phosphor particles contain the garnet phase as the major phase. Alumina and extra phases other than the garnet phase were not observed.

An absorptance and internal quantum efficiency of the phosphor particles were measured over an emission wavelength range of 480 to 780 nm at an excitation wavelength of 450 nm using an integrating sphere. The result is also shown in Table 1.

TABLE 1

| | Particle size of primary particles (μm) | Average particle size of secondary particles (μm) | Absorptance (%) | Internal quantum efficiency (%) | External quantum efficiency (%) |
|---|---|---|---|---|---|
| Example 1 | 0.5-1 | 18 | 0.91 | 0.95 | 0.86 |
| Example 2 | 1-3 | 16 | 0.92 | 0.97 | 0.89 |
| Comparative Example 1 | not observed | 23 | 0.88 | 0.91 | 0.80 |
| Comparative Example 2 | 1-3 | 19 | 0.87 | 0.88 | 0.77 |

Japanese Patent Application No. 2011-001123 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. Phosphor particles in the form of spherical polycrystalline secondary particles consisting of a multiplicity of primary particles, at least one particle of said primary particles consisting of a garnet phase having the compositional formula (1):

$$(A_xB_yC_z)_3C_5O_{12} \quad (1)$$

wherein A is at least one rare earth element selected from the group consisting of Y, Gd, and Lu, B is at least one rare earth element selected from the group consisting of Ce, Nd, and Tb, C is at least one element selected from the group consisting of Al and Ga, and x, y and z are positive numbers in the range: $0.002 < y \leq 0.2$, $0 < z \leq 2/3$, and $x+y+z=1$, said secondary particles having an average particle size of 5 to 50 μm, the garnet phase having the compositional formula (1) included in the phosphor particles being a major phase among crystal phases in the phosphor particles.

2. The phosphor particles of claim 1 wherein said primary particles have a particle size of 0.1 to 5 μm.

3. A method for preparing the phosphor particles of claim 1, comprising the steps of:
providing a powder oxide or oxides containing one or more of the elements A, B, and C in compositional formula (1) as a starting material,
using one powder oxide in which the elements A, B, and C are present in an atomic ratio of C/(A+B)>5/3 or mixing two or more powder oxides such that the elements A, B, and C may be present in an atomic ratio of C/(A+B)>5/3,
granulating the powder oxide or powder oxide mixture into granules with an average particle size of 5 to 65 μm,
melting the granules in a plasma and solidifying outside the plasma, thereby obtaining spherical particles, and
heat treating the particles in a non-oxidizing atmosphere at a temperature of higher than 800° C. to 1,700° C.

4. The method of claim 3 wherein no flux is added to the powder oxide or powder oxide mixture.

5. The method of claim 3 wherein said primary particles have a particle size of 0.1 to 5 μm.

6. The phosphor particles of claim 1 wherein the elements A, B and C are present in an atomic ratio of C/(A+B)≥5.02/2.98.

7. The phosphor particles of claim 1 wherein the element C comprises Al.

8. The method of claim 3 wherein the elements A, B and C are present in an atomic ratio of C/(A+B)≥5.02/2.98.

9. The method of claim 3 wherein the element C comprises Al.

10. The phosphor of claim 1 wherein the phosphor particles comprise the garnet phase having the compositional formula (1) in a range of at least 99% by volume of all crystal phases.

11. Phosphor particles in the form of spherical polycrystalline secondary particles consisting of a multiplicity of primary particles, at least one particle of said primary particles consisting of a garnet phase having the compositional formula (1):

$$(A_xB_yC_z)_3C_5O_{12}, \qquad (1)$$

wherein A is at least one rare earth element selected from the group consisting of Y, Gd, and Lu, B is at least one rare earth element selected from the group consisting of Ce, Nd, and Tb, C is at least one element selected from the group consisting of Al and Ga, the elements A, B and C are present in an atomic ratio of C/(A+B)≥5.02/2.98 and x, y and z are positive numbers in the range: 0.002<y≤0.2, 0<z≤2/3, and x+y+z=1, said secondary particles having an average particle size of 5 to 50 μm.

12. The phosphor particles of claim 11 wherein said primary particles have a particle size of 0.1 to 5 μm.

13. The phosphor particles of claim 11 wherein the element C comprises Al.

14. A method for preparing the phosphor particles of claim 11, comprising the steps of:
providing a powder oxide or oxides containing one or more of the elements A, B, and C in compositional formula (1) as a starting material,
using one powder oxide in which the elements A, B, and C are present in an atomic ratio of C/(A+B)>5.02/2.98 or mixing two or more powder oxides such that the elements A, B, and C may be present in an atomic ratio of C/(A+B)>5.02/2.98,
granulating the powder oxide or powder oxide mixture into granules with an average particle size of 5 to 65 μm,
melting the granules in a plasma and solidifying outside the plasma, thereby obtaining spherical particles, and
heat treating the particles in a non-oxidizing atmosphere at a temperature of higher than 800° C. to 1,700° C.

15. The method of claim 14 wherein no flux is added to the powder oxide or powder oxide mixture.

16. The method of claim 14 wherein said primary particles have a particle size of 0.1 to 5 μm.

17. The method of claim 14 wherein the element C comprises Al.

* * * * *